United States Patent [19]

Ehlers

[11] Patent Number: 4,585,508

[45] Date of Patent: Apr. 29, 1986

[54] APPARATUS FOR TRANSVERSE SEALING LAYERS OF ELONGATED THERMOPLASTIC MATERIAL

[75] Inventor: Dennis W. Ehlers, Green Bay, Wis.

[73] Assignee: Paper Converting Machine Co., Green Bay, Wis.

[21] Appl. No.: 665,054

[22] Filed: Oct. 26, 1984

[51] Int. Cl.[4] .................................................. B30B 5/06
[52] U.S. Cl. ..................................... 156/494; 156/553; 156/583.5; 493/193; 493/205; 493/208
[58] Field of Search ...................... 156/553, 583.5, 494, 156/229; 493/193, 205, 208

[56] References Cited

U.S. PATENT DOCUMENTS

| | | | |
|---|---|---|---|
| 3,107,585 | 10/1963 | Nystrand | 493/205 |
| 3,147,168 | 9/1964 | Bateman | 156/583.5 |
| 4,198,259 | 4/1980 | van der Meulen | 156/583.5 |
| 4,419,167 | 12/1983 | Hay, II et al. | 156/583.5 |

*Primary Examiner*—Michael Wityshyn
*Attorney, Agent, or Firm*—Tilton, Fallon, Lungmus & Chestnut

[57] ABSTRACT

An apparatus for transversely sealing layers of thermoplastic material wherein platen-equipped upper and lower cross bar conveyors are provided for the sealing, there is provided means for jogging the thermoplastic web material incident to heat-up of the platens to prevent scorching of the web and means for stretching the layered web during sealing to overcome the tendency for differential longitudinal shrinkage.

6 Claims, 6 Drawing Figures

APPARATUS FOR TRANSVERSE SEALING LAYERS OF ELONGATED THERMOPLASTIC MATERIAL

BACKGROUND AND SUMMARY OF INVENTION

This invention relates to apparatus for transversely sealing layers of elongated thermoplastic material and, more particularly, to apparatus employing confronting heated platens.

Illustrative of apparatus to which the invention can be advantageously applied is U.S. Pat. No. 4,419,167. There, upper and lower cross bar conveyors are arranged to have parallel runs flanking layers of web material with the means for heating the platens being essentially remote from the path of travel of the web layers. Two problems arise in the utilization of such heated platens. One pertains to the possible scorching of the web material during heat-up of the apparatus and the other relates to the tendency of the web portions between seals to shrink differentially.

We have solved this through a unique, compact and essentially simple apparatus for stretching and/or jogging the web layers while they are in the sealing path. More particularly, the means for stretching and/or jogging includes a vane-equipped shaft operable from the underside of the lower conveyor run in the sealing path. Other objects and advantages of the invention may be seen in the details of the ensuing specification.

The invention is explained in conjunction with an illustrative imbodiment in the accompanying drawing, in which FIG. 1 is a schematic side elevational view of apparatus for practicing the invention;

DETAILED DESCRIPTION

Figure 1:
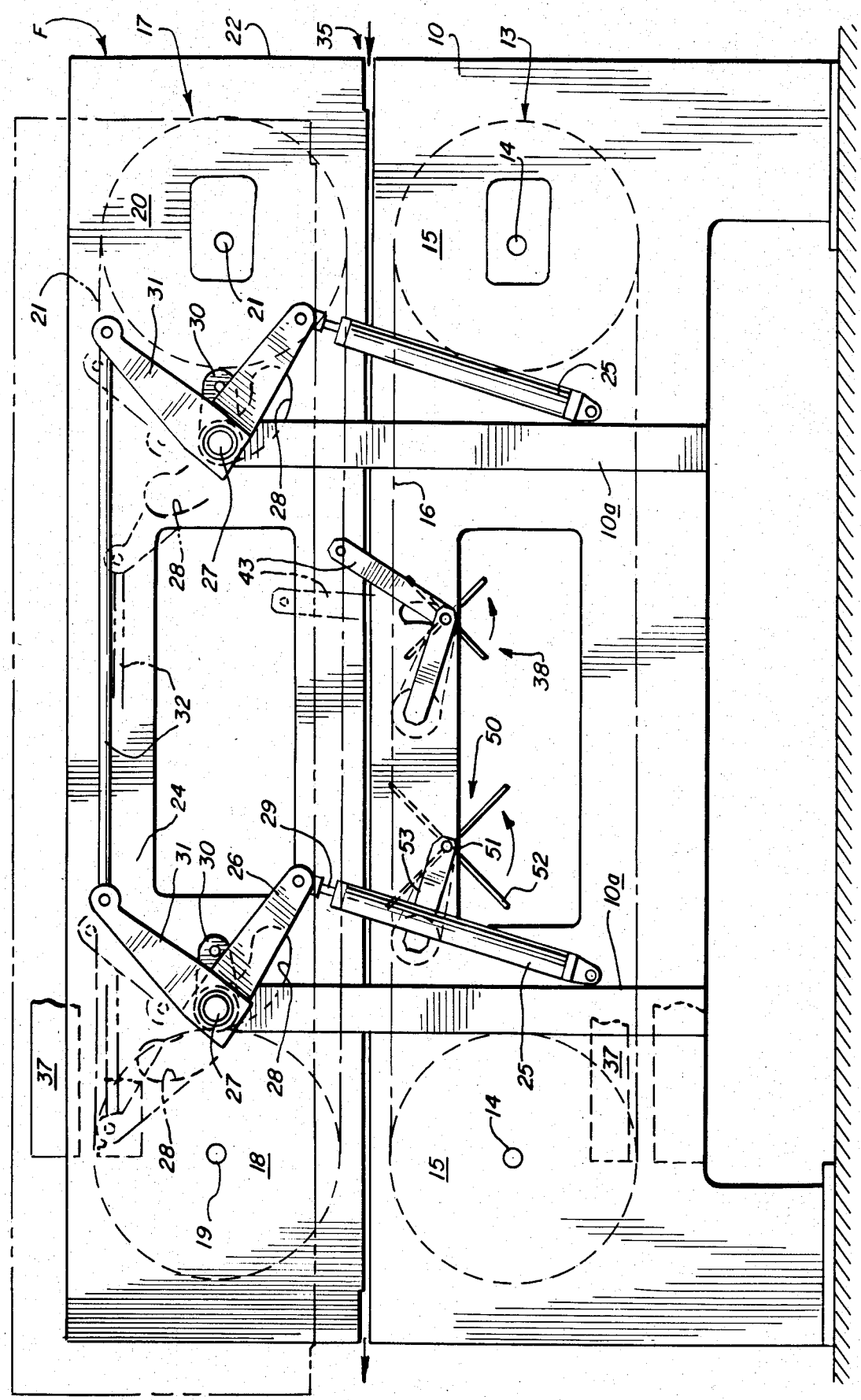
Figure 2:
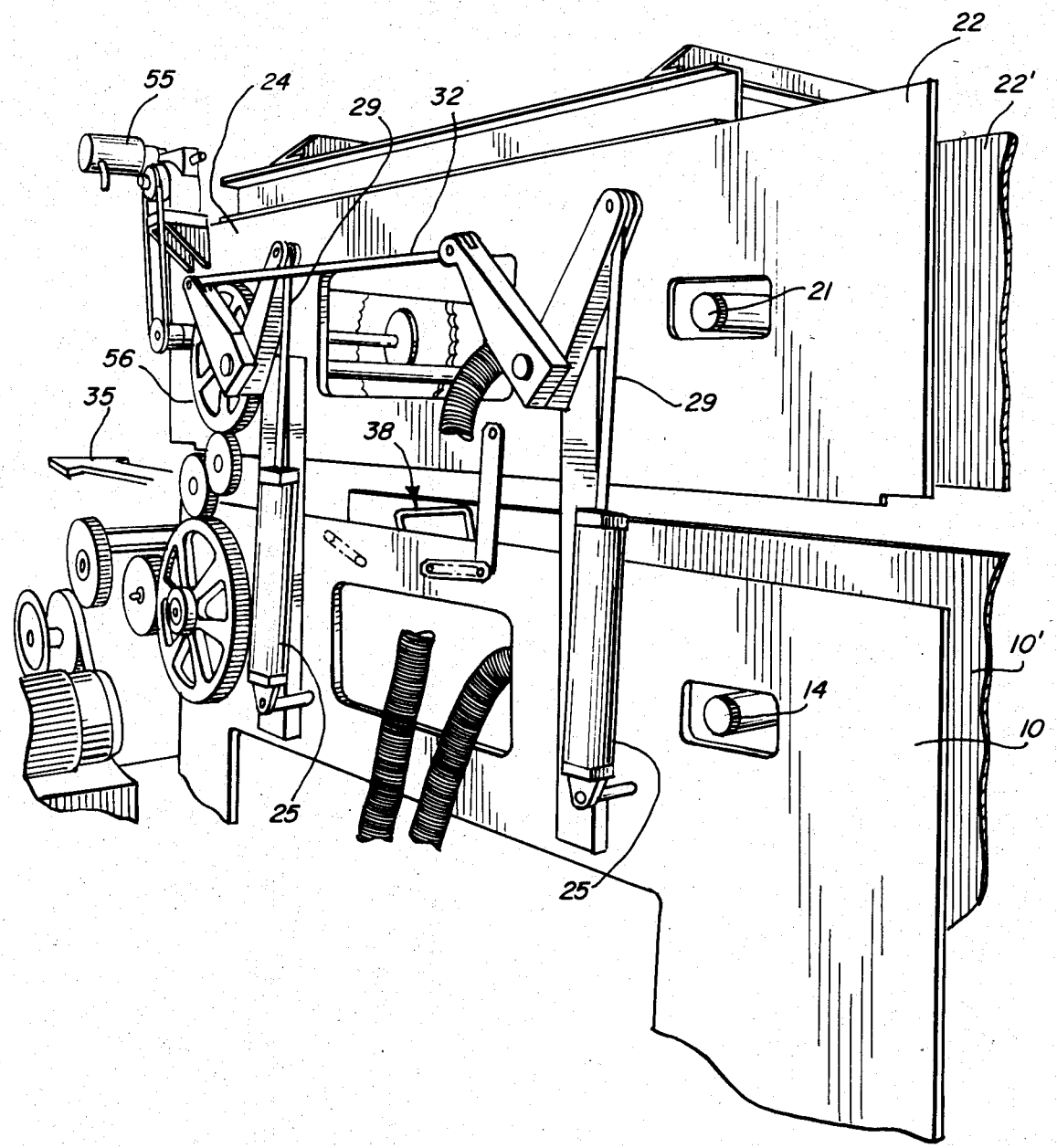
FIG. 2 is a fragmentary perspective view of apparatus constructed according to the schematic representation in FIG. 1.
Figure 3:
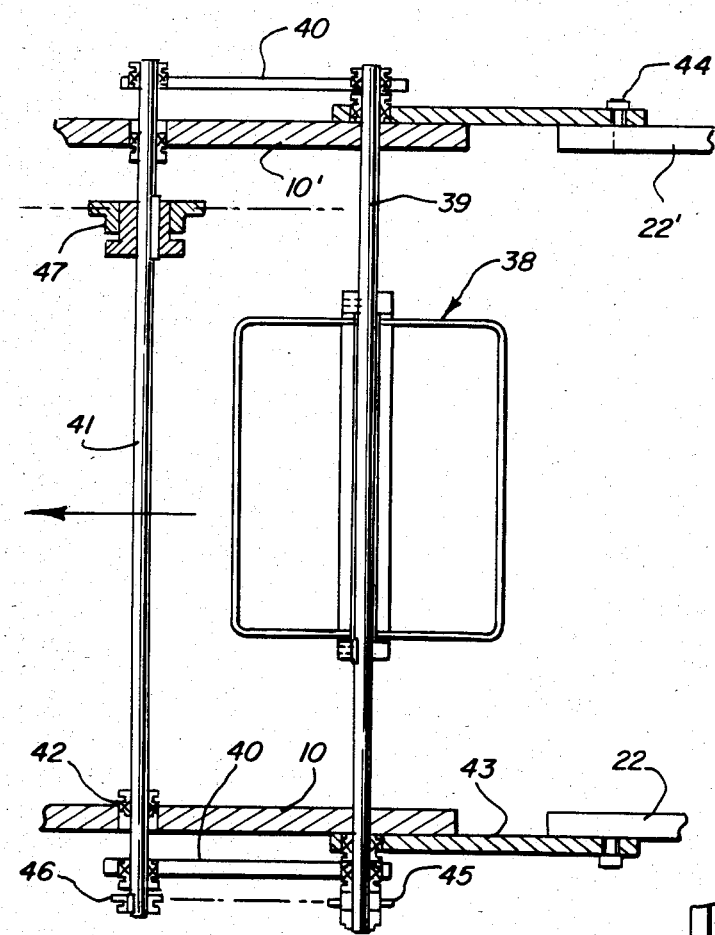
FIG. 3 is a transverse sectional view of a portion of the apparatus of FIGS. 1 and 2 and which shows the details of the stretching and/or jogging mechanism.
Figure 4:
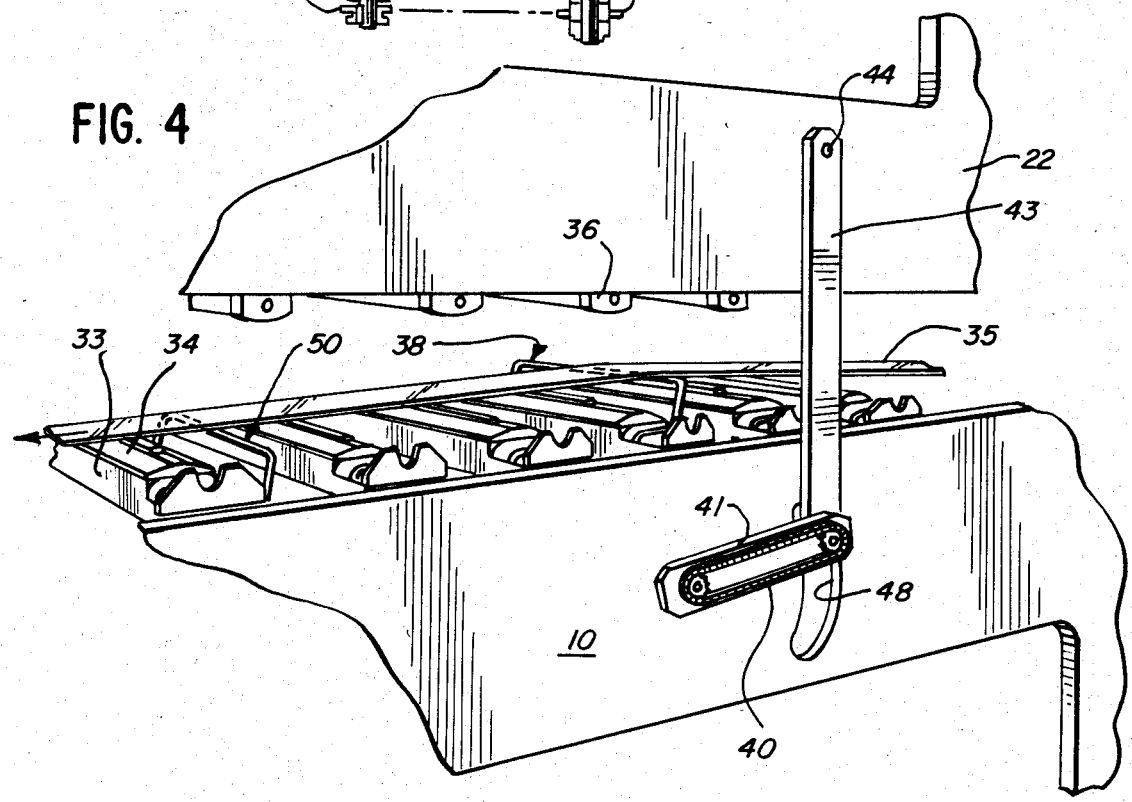
FIG. 4 is a fragmentary perspective view of a portion of the apparatus featuring the path of web travel under jogging conditions and when viewed from the side of the apparatus opposite to that seen in FIG. 2.

In the illustration given and with reference first to FIG. 1, the symbol F designates generally a frame including a pair of lower side frames (one of which is designated 10). The side frames are supported by pedestals on a floor. The side frame 10 seen in FIGS. 1, 2 and 4 is that on the so-called "drive" side of the apparatus while the other side frame 10' seen in FIG. 3 is on the "operator" side of the apparatus.

As seen in FIG. 1, the frame F supports a bottom cross bar conveyor 13 which includes the usual cross shafts 14, head and tail sprockets 15 and connecting roller chain 16. For further details of constructions of the conveyor 13 and also the upper conveyor generally designated 17, reference may be made to co-pending, co-owned application of Hertel and Spencer, Ser. No. 665,053, filed Oct. 26, 1984. Further, the disclosure in the above-identified application is incorporated herein by express reference and may be considered to be fully a part thereof.

The upper conveyor 17 also includes two pairs of sprockets in conventional cross bar conveyor fashion. The driving or head sprockets 18 are mounted on a cross shaft 19 while the driven or tail sprockets 20 are mounted on the cross shaft 21 with one each of the head and tail seal sprockets 18, 20, respectively being coupled by endless chains being entrained thereon.

The upper cross bar conveyor 17 is mounted on a frame section designated 22 which is separate from the floor-supported frame 10 and is mounted for movement toward and away from the lower frame 10. One upper side frame 22 is seen in FIG. 2 while the opposite or operator side frame 22' is seen in FIG. 3. The means for elevating the side frames 22, 22' and the associated mechanism, particularly the upper conveyor 17 is generally designated 24 in FIGS. 1 and 2.

The elevating means 24 includes a pair of power cylinders 25 which are pivotally mounted on the lower drive side frame 10. Each is coupled by a link 26 to a movable cross shaft 27. Each cross shaft 27 is supported on columns 10a and rides in an arcuate slot 28 so that when the piston rods 29 of the power cylinders 25 are extended, the slot 28 permits the upper frames 22, 22' to move upwardly. This is due to the fact that arms 30 are also fixed to the shaft 27 and are pivotally connected to the upper frame 22, 22'. Thus, as the cross shafts 27 rotate under the influence of the power cylinders 25, the arms 30 pivot to elevate the upper frame 22, 22' and in so doing the cross shaft 27 in effect moves down the slot 28. In FIG. 1 it will be seen that the two such means for raising the upper frame 22, 22' are connected by means of a linkage including arms 31 and connecting rod 32.

Normally, the upper frame 22, 22' will be elevated relative to the lower frame 10 at start-up and warm-up so as to separate the cross bars of the upper conveyor from the cross bars of the lower conveyor. The cross bars of the lower conveyor are designated 33 in FIG. 4 and can be seen to carry platens 34 for cooperation with mating platens on the upper conveyor 17 in clamping the web 35 (still referring to FIG. 4) incident to sealing. As mentioned previously, the showing in FIG. 4 has the upper frame 22 raised or elevated relative to the lower frame 10 with the ends of the cross bars of the upper conveyor 17 being visible as at 36.

Means for heating the platens 34 and those (not shown) on the cross bars 36, are provided in the form of radiant heaters as at 37—see the left hand portion of FIG. 1. Again, reference may be had to the above-identified co-pending, co-owned application Ser. No. 665,053, filed Oct. 26, 1984 for details of construction and operation not set forth herein.

Jogging Means

Figure 6:
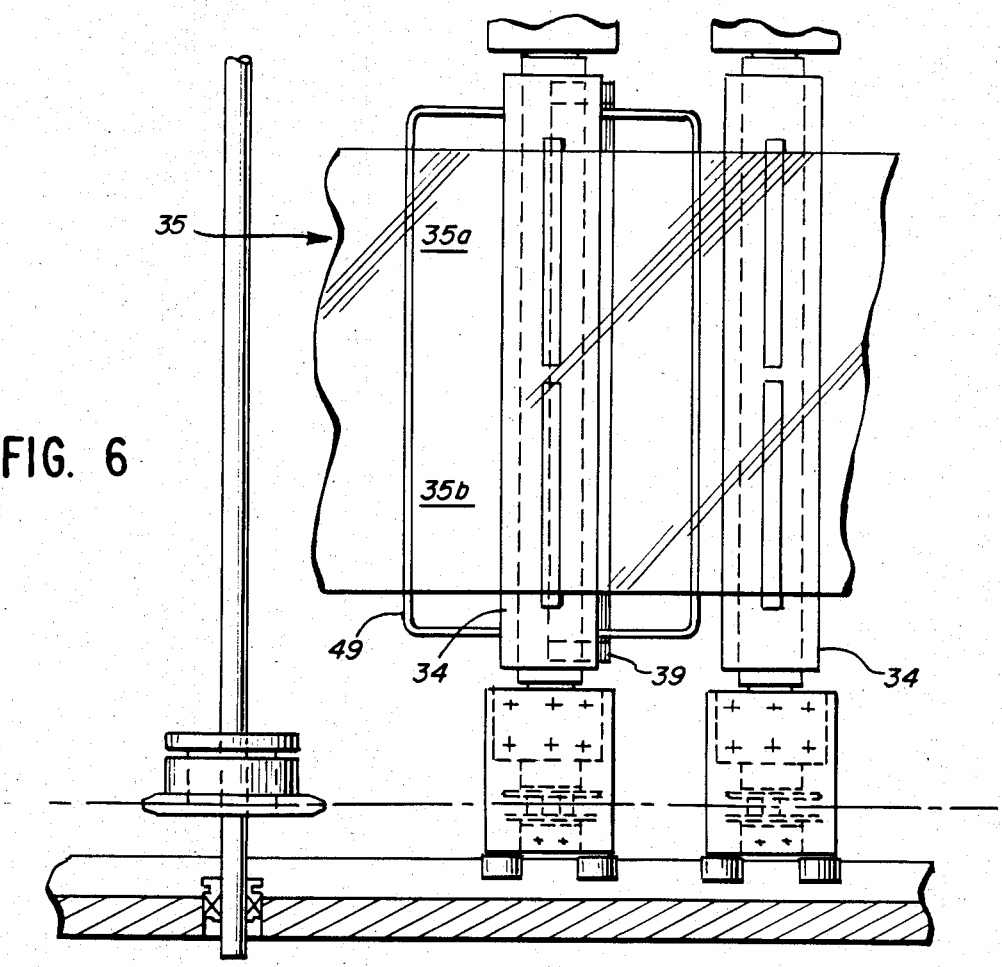
FIG. 6 is a top plan view of the mechanism seen in FIG. 5.

During warm-up of the platens 34 or when downstream jamups occur, the upper frame 22, 22' is elevated as illustrated in FIG. 4. At this time, it has been found advantageous to keep the web 35 from prolonged contact with the platens which are being continuously cycled and radiantly heated to maintain proper sealing temperatures while upper conveyor 17 and lower conveyor 13 operate continuously in the opened condition. To this end, we employ a web jogging means generally designated 38—see the right central portion of FIG. 1. More particularly, the web jogging means 38 includes a vane-equipped shaft 39 which can be seen in greater detail in FIGS. 3, 5 and 6.

Figure 5:
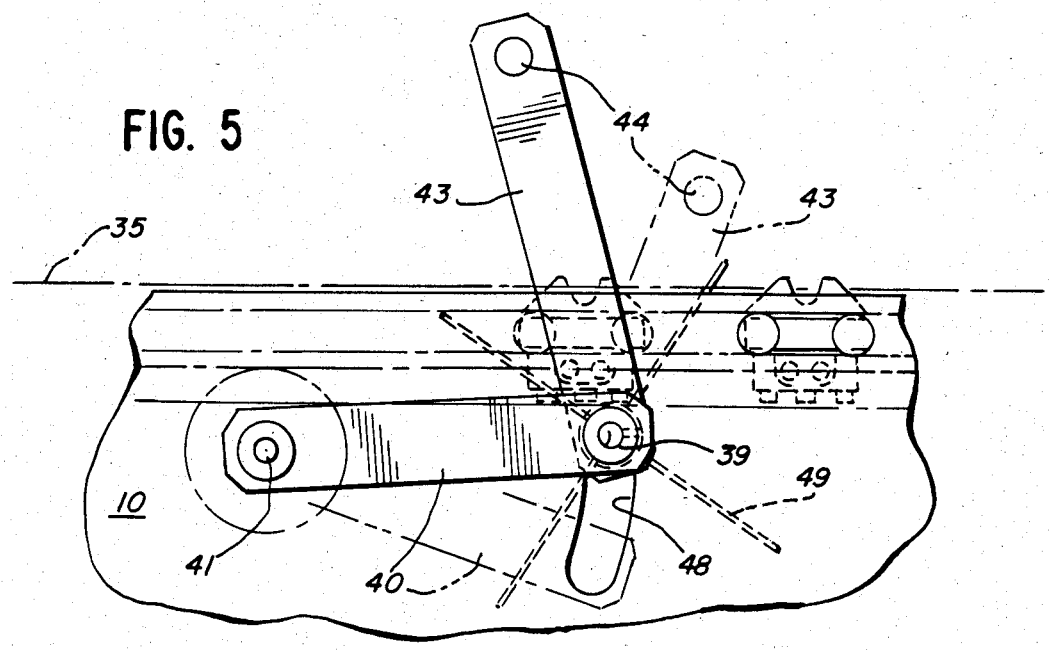
FIG. 5 is an enlarged fragmentary side elevational view of the vane-equipped shaft.

As can be appreciated best from FIG. 5, the shaft 39 is rotatably mounted within an arm 40 which in turn is pivotally mounted on a cross shaft 41 (also see FIG. 3)—and which in turn is journalled as at 42 in the side frames 10 and 10'.

Still further, the cross shaft 39 is pivotally received adjacent one end of an arm 43 (see FIGS. 1 and 5) which, at its other end, is pivotally connected as at 44 to the upper frames 22 and 22'. Thus, as the upper frame 22, 22' is elevated, the cross shaft 39 is also elevated by pivoting around the axis of the shaft 41.

On the drive side of the machine, the shaft 39 is equipped with a sprocket 45—see FIGS. 3 and 4—which is driven via a chain from a drive sprocket 46 on the shaft 41. This drive is omitted from FIG. 1 for clarity of presentation. The shaft 41 in turn is driven through a sprocket 47 (still referring to FIG. 3). To accommodate the pivotal upward movement of the shaft 39 the lower frames 10, 10' are slotted as at 48—see FIG. 5.

The shaft 39 is equipped (see FIG. 3) with four vanes 38. As can be quickly appreciated from the left hand portion of FIG. 4, the vanes are provided in the form of a U-shaped wire rod which, when the upper frame 22, 22' is elevated, extends up between adjacent cross bars. By virtue of rotating the shaft 39, the vanes 38 are synchronously timed with spaces between adjacent platens, and project successively upward to support the web above the platens on the lower conveyor 13.

Stretcher

A similar arrangement to the jogger is provided to limitedly stretch the web layers during the actual sealing operation. This is generally designated 50 in FIG. 1 and has the same components as the jogger 38 except for the link or arm 43. In other words, there is a cross shaft 51 equipped with U-shaped vanes 52—still referring to FIG. 1.

The shaft 51 is again driven as by means of a drive 53 similar to that involving the chain connected sprockets 45, 46 with respect to the jogger 38. Normally, the vanes 52, at their zenith, project above the plane of the layered web about $\frac{1}{8}$" to $\frac{1}{4}$" to develop the advantageous stretching of the clamped, layered web. The side frames 10, 10' are equipped with short arcute slots (not shown but counterparts to the slots 48) to permit limited adjustment of the height of the vanes at zenith for performing the stretching. It has been found that there is differential shrinkage along longitudinally extending lines (longitudinal, in the sense of web movement through the apparatus). We have found that by applying a tension force across the entire width of the web, this tendency for differential shrinkage is effectively eliminated.

Operation

In the practice of the invention, layered web 35 (see the right hand portion of FIG. 1) is advanced through the apparatus which includes a stationary bottom frame made up of side member 10, 10'—see also FIG. 2. An elevatable upper frame including side frames 22, 22' is also provided. Mounted on the bottom frame is a cross bar conveyor 13 and on the top frame a cross bar conveyor 17. The cross bars are equipped with platens 34 (compare FIGS. 4 and 6).

Upon startup, the elevating or raising mechanism generally designated 24 (see FIG. 1) is actuated by introducing compressed air into the power cylinders 25 (see the right and left hand portions of FIG. 1). This causes extension of the piston rods 29—see FIG. 2—which in turn elevates the upper frame 22, 22'. Thereupon, the layered web 35 can be threaded through the machine while the upper and lower conveyors 17, 13 are cycled so as to heat the platens 34 thereof by means of the radiant heaters 37 (see FIG. 1). To prevent the web 35 from being scorched or otherwise deformed by substantial contact with the platens 34, the jogger 38 (see the right hand portion of FIG. 1) is actuated so that the vanes 49 (FIG. 5) rotate with the upper point of rotation being from about 1" to 2" above the upper facing platens. This insures minimal contact of the web 25 with platens on the lower conveyor 13.

The vanes 49 are mounted on a cross shaft 39 which is powered through chain connected sprockets 45, 46 (see FIG. 3). By virtue of the cross shaft 39 being carried in the arms 40 and further by being coupled to the top frame 22, 22' by the links 43, the elevation of the top frame 22, 22' results in raising the vane-equipped shaft 39 to its operative position.

During periods when conveyors 13 and 17 are in the "open" position, as for example during startup and platen heating modes, an auxiliary motor 55 drives the conveyors at reduced speed. When in the lowered co-acting mode, and after the platens have been heated to operating temperature, the upper frame 22, 22' is brought down into operating position where platens on the upper conveyor 17 move in synchronism with the platens on the lower conveyor 13. The synchronizing drive for this purpose is designated 56 and is seen in the left hand portion of FIG. 2. This drive is connected to the shafts 14, 19 and 21 and therefore to the chain carrying sprockets 15, 18 and 20.

The operation of the upper and lower conveyors 17, 13, advances the layered web through the apparatus and by virtue of the clamping engagement of the upper and lower platens 34 cross seals the layered webs together. There is a tendency of the web to experience differential shrinkage along different longitudinally extending lines. In other words, the web 35 (see FIG. 6) may shrink more in the area 35a than in the area 35b. However, by virtue of employing a stretcher in the form of the vane equipped shaft 51, a limited tension is applied to each section of the web between platens 34 and overcomes the tendency for differential shrinkage.

We have found it advantageous to utilize different mechanisms for the jogger 38 and the stretcher 50. However, because of the substantial identity of construction of the operating elements, these could be provided by a single mechanism. In the illustration given, the stretcher 50 is downstream of the jogger 38 so as to operate on the layered web when the sealing is more complete. Also, the separation of the jogging and stretching functions makes simpler the adjustment of the stretcher 50. It will be appreciated that a great deal of mechanism is provided on the side frames, particularly on the drive side as seen in FIG. 2 and the provision of separate mechanisms avoids the need for crowding.

While in the foregoing specification, a detailed description of an embodiment of the invention has been set down for the purpose of illustration, many variations in the details hereingiven may be made by those skilled in the art without departing from the spirit and scope of the invention.

We claim:

1. Apparatus for transversely sealing layers of elongated thermoplastic material comprising a relatively elongated frame defining the side of a longitudinally extending path for horizontally advancing said layers in superposed relation,
   upper and lower longitudinally extending cross bar conveyors movably mounted on said frame and including parallel chains, sprockets and cross bars and with each conveyor having an upper run and a lower run, the lower run of said upper conveyor and the upper run of said lower conveyor defining respectively the top and bottom of said path,
   a plurality of sealing platens mounted on said cross bars between the chains of each conveyor transverse of said path, said sealing platens being arranged to clamp said layers, said
   layer stretching and jogging means mounted on said frame adjacent said path, said means including a shaft mounted on said frame, a plurality of vane means extending radially of said shaft, and means for rotating said shaft in synchronism with the movement of said conveyors.

2. The apparatus of claim 1 in which each vane means includes a U-shaped metal rod.

3. The apparatus of claim 1 in which said apparatus includes a pair of shafts, one for jogging adjacent the beginning of said path and one for stretching adjacent the end of said path.

4. The apparatus of claim 3 in which said frame includes an upper frame carrying said upper conveyor, and means for selectively moving said upper frame upwardly away from said path, said jogging means also being coupled to said upper frame.

5. The apparatus of claim 1 in which said vane means moves upwardly and extends slightly above the path of web travel to stretch a web suspended between two successive platens and is moved differentially upward to intermittently lift web material upwardly above the top surfaces of platens mounted on the lower conveyor in order to keep the web from scorching when upper and lower conveyors operate in the opened condition.

6. Apparatus for transversely sealing layer of elongated thermoplastic material comprising a relatively elongated frame defining the sides of a longitudinally extending path for horizontally advancing said layers in superposed relation,
   upper and lower longitudinally extending cross bar conveyors movably mounted on said frame and including parallel chains, sprockets and cross bars and with each conveyor having an upper run and a lower run, the lower run of said upper conveyor and the upper run of said lower conveyor defining respectively the top and bottom of said path,
   a plurality of sealing platens mounted on said cross bars between the chains of each conveyor transverse of said path, said sealing platens being arranged to clamp said layers, and
   vane-equipped rotatable means mounted on said frame under said path for imparting a lifting force on said layers.

* * * * *